United States Patent [19]

Miller et al.

[11] Patent Number: 5,305,917
[45] Date of Patent: Apr. 26, 1994

[54] SIMULTANEOUS DISPENSING APPARATUS

[75] Inventors: William A. Miller, Buffalo Grove; Theodore R. Arneson, Lake Zurich; Andrew V. Platacis, Crystal Lake; Jeffrey D. Krull, Chicago, all of Ill.

[73] Assignee: Fluid Management Limited Partnership, Wheeling, Ill.

[21] Appl. No.: 978,924

[22] Filed: Nov. 19, 1992

[51] Int. Cl.$^5$ .............................. B67D 5/08
[52] U.S. Cl. ................... 222/63; 222/137; 222/333; 222/318; 222/390
[58] Field of Search ............... 222/63, 137, 145, 263, 222/276, 318, 333, 380, 390

[56] References Cited

U.S. PATENT DOCUMENTS

| | | |
|---|---|---|
| 869,246 | 10/1907 | Jones . |
| 872,943 | 12/1907 | Jones . |
| 904,371 | 11/1908 | Stewart . |
| 1,030,854 | 6/1912 | Percy . |
| 1,270,835 | 7/1918 | Jersemann . |
| 1,641,280 | 9/1927 | Joslin et al. . |
| 1,836,879 | 12/1931 | Selig et al. . |
| 1,959,694 | 5/1934 | Stevens . |
| 2,185,277 | 1/1940 | Stelzer . |
| 2,207,139 | 7/1940 | Weightman . |
| 2,281,094 | 4/1942 | Chambers . |
| 2,354,573 | 7/1944 | Brock . |
| 2,416,581 | 2/1947 | Harr . |
| 2,428,035 | 9/1947 | Palm . |
| 2,536,277 | 1/1951 | Grieme . |
| 2,606,696 | 8/1952 | Miner . |
| 2,619,116 | 11/1952 | Ralston . |
| 2,645,401 | 7/1953 | Kerr . |
| 2,654,505 | 10/1953 | Fuhrman . |
| 2,665,825 | 1/1954 | Poitras et al. . |
| 2,675,760 | 4/1954 | Hall . |
| 2,675,946 | 4/1954 | Strempel . |
| 2,684,804 | 7/1954 | Huntar et al. . |
| 2,786,419 | 3/1957 | Lynn . |
| 2,821,172 | 1/1958 | Randall . |
| 2,843,044 | 7/1958 | Mashinter . |
| 2,905,361 | 9/1959 | Noall . |
| 2,940,724 | 6/1960 | Sieling . |
| 3,015,415 | 1/1962 | Marsh et al. . |
| 3,023,936 | 3/1962 | Marsh et al. . |
| 3,042,310 | 7/1962 | Franke et al. . |
| 3,068,650 | 12/1962 | Phillips . |
| 3,242,881 | 3/1966 | Schafer . |
| 3,349,962 | 10/1967 | Levin .................... 222/137 |
| 3,390,815 | 7/1968 | Kavan et al. . |
| 3,426,945 | 2/1969 | Harriman . |
| 3,499,387 | 3/1970 | Zippel .................... 222/137 |
| 3,545,680 | 12/1970 | Ottaway . |
| 3,589,610 | 6/1971 | Wahlin et al. . |
| 3,791,590 | 2/1974 | Dieter . |
| 3,830,405 | 8/1974 | Jaeger . |
| 3,854,629 | 12/1974 | Blieberger . |
| 3,890,922 | 6/1975 | Nordenholt . |
| 3,895,748 | 7/1975 | Klingenberg . |
| 3,913,797 | 10/1975 | Brym . |
| 3,913,801 | 10/1975 | Wise et al. . |
| 3,932,065 | 1/1976 | Ginsberg et al. . |

(List continued on next page.)

FOREIGN PATENT DOCUMENTS

| | | |
|---|---|---|
| 419393A1 | 3/1991 | European Pat. Off. . |
| 2417093 | 10/1979 | France .................... 222/137 |
| WO87/05537 | 9/1987 | PCT Int'l Appl. . |
| WO87/05697 | 9/1987 | PCT Int'l Appl. . |
| 1310655 | 3/1973 | United Kingdom . |

Primary Examiner—Andres Kashnikow
Assistant Examiner—Philippe Derakshani
Attorney, Agent, or Firm—Fitch, Even, Tabin & Flannery

[57] ABSTRACT

Dispensing apparatus is provided for simultaneously dispensing metered quantities of a plurality of materials into a common receptacle. Pump modules each containing a plurality of individual pump members are arranged in a rectangular pattern, between a base plate and a drive plate. The drive plate is raised and lowered, toward and away from the base plate, by a pair of drive screws. The plurality of individual pump members are thus simultaneously operated to dispense different materials into a common receptacle, at the same time.

38 Claims, 8 Drawing Sheets

U.S. PATENT DOCUMENTS

| | | |
|---|---|---|
| 3,937,440 | 2/1976 | MacGregor et al. . |
| 3,963,377 | 6/1976 | Elliott et al. . |
| 3,979,172 | 9/1976 | Sogo et al. . |
| 4,004,717 | 1/1977 | Wanke . |
| 4,046,287 | 9/1977 | Hoekstra et al. . |
| 4,047,849 | 9/1977 | Clay . |
| 4,053,012 | 10/1977 | Farmer . |
| 4,105,146 | 8/1978 | Broillard . |
| 4,108,335 | 8/1978 | Hoff et al. ............................ 222/137 |
| 4,119,058 | 10/1978 | Schmermund . |
| 4,134,689 | 1/1979 | Ahrenskou-Sorenson . |
| 4,142,707 | 3/1979 | Bjorklund . |
| 4,150,769 | 4/1979 | James . |
| 4,155,490 | 5/1979 | Glenn . |
| 4,212,413 | 7/1980 | Barber, Jr. et al. . |
| 4,228,924 | 10/1980 | Gilbert ................................ 222/137 |
| 4,265,613 | 5/1981 | Oppenberg . |
| 4,314,653 | 2/1982 | Sindoni . |
| 4,350,477 | 9/1982 | Mazal . |
| 4,363,429 | 12/1982 | Schindler . |
| 4,371,096 | 2/1983 | Scholl et al. . |
| 4,394,945 | 7/1983 | Taylor, Jr. . |
| 4,403,764 | 9/1983 | Repplinger . |
| 4,410,108 | 10/1983 | Minard . |
| 4,516,702 | 5/1985 | Schmidt . |
| 4,519,526 | 5/1985 | Hillman . |
| 4,526,215 | 7/1985 | Harrison et al. . |
| 4,597,719 | 7/1986 | Tano . |
| 4,607,998 | 8/1986 | Hawkes . |
| 4,615,902 | 10/1986 | Falcoff et al. . |
| 4,648,810 | 3/1987 | Schippers et al. . |
| 4,653,813 | 3/1987 | Burgdorf . |
| 4,789,245 | 12/1988 | Morbeck . |
| 4,834,548 | 5/1989 | Tempel et al. . |
| 4,878,601 | 11/1989 | Flemming et al. . |
| 4,946,100 | 8/1990 | Flemming et al. . |
| 4,966,467 | 10/1990 | Johnson . |
| 5,083,591 | 1/1992 | Edwards et al. . |
| 5,217,146 | 6/1993 | Neff et al. ............................ 222/276 |

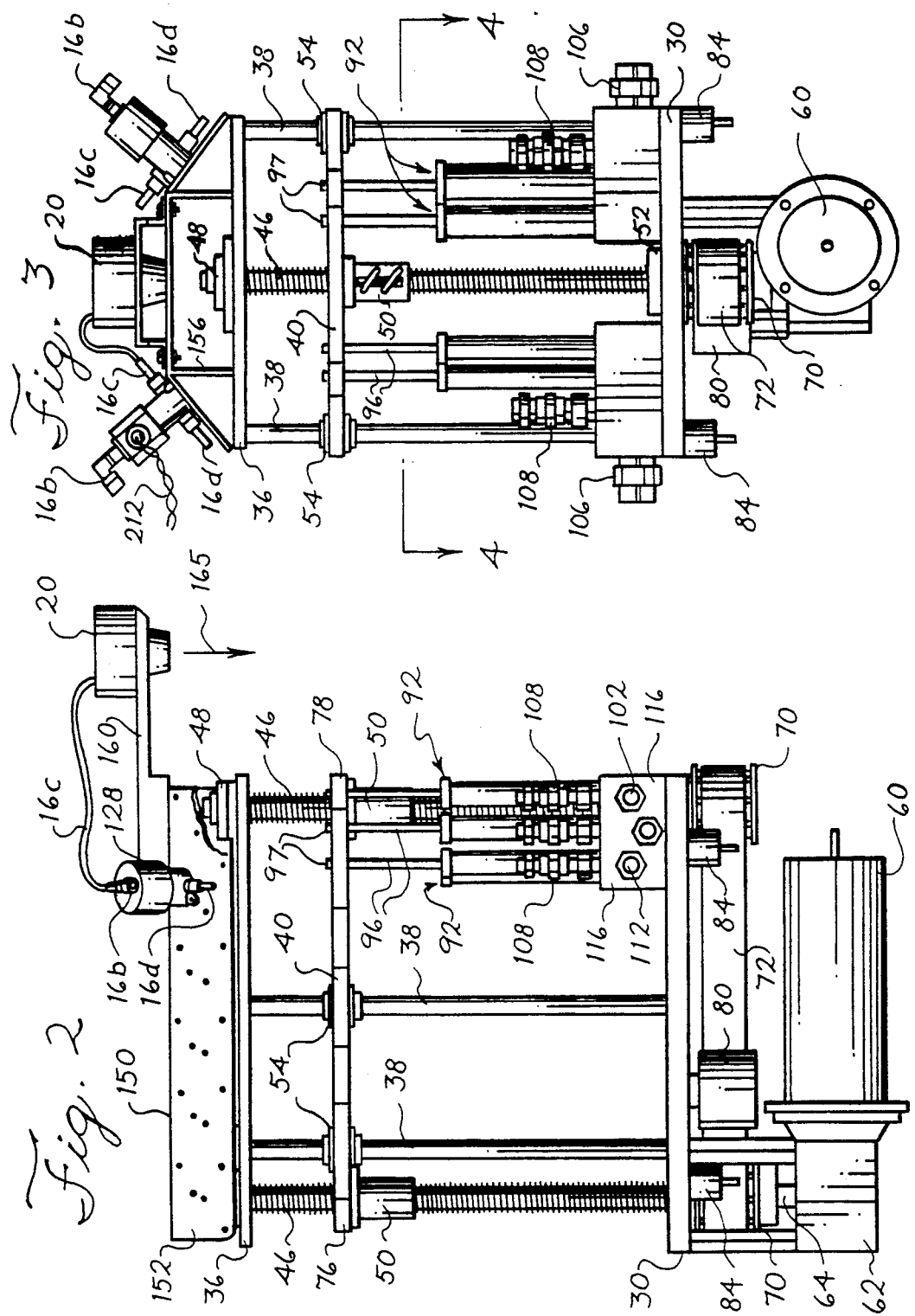

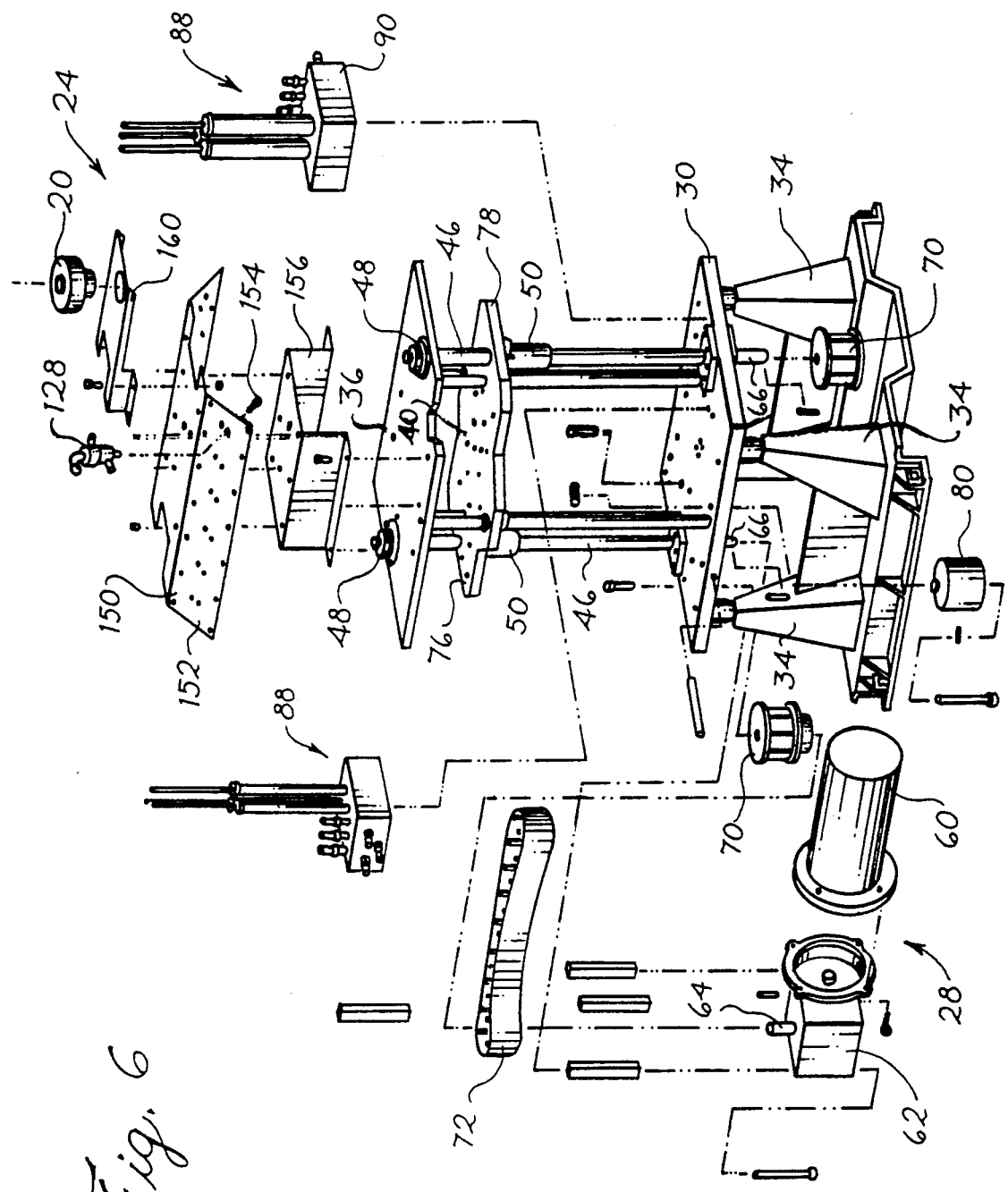

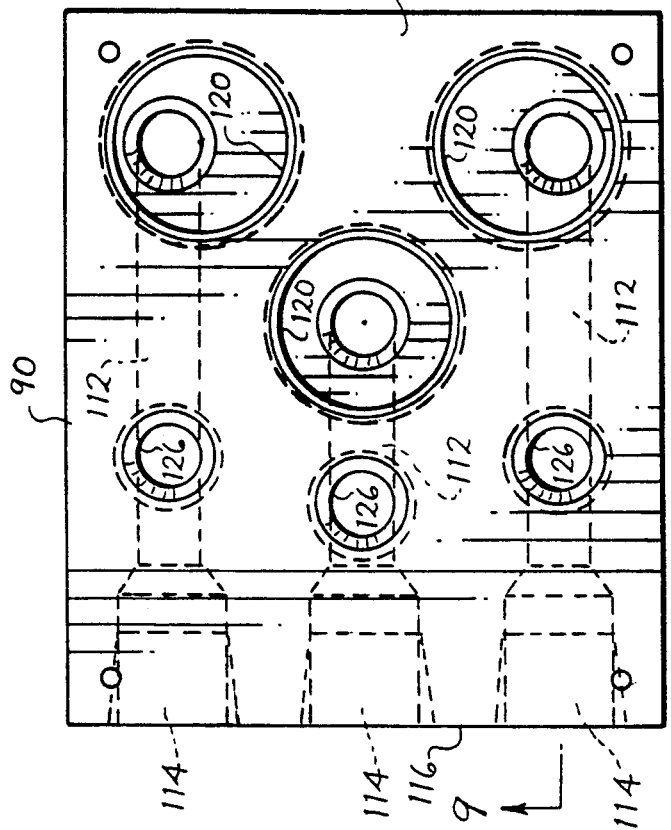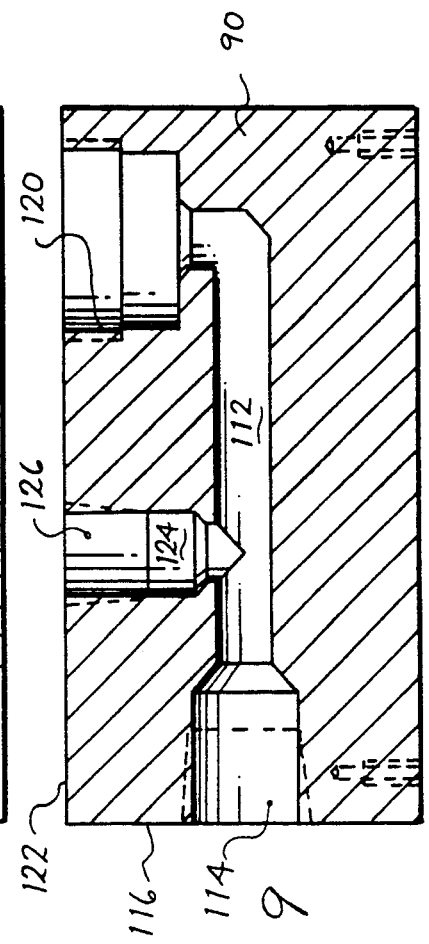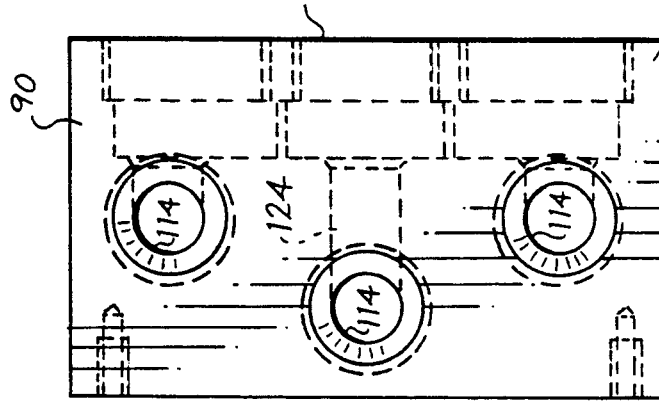

SIMULTANEOUS DISPENSING APPARATUS

BACKGROUND OF THE INVENTION

1. Field of the Invention

The present invention pertains to apparatus for dispensing liquid and pulverulent materials, such as paint formulations, and in particular to apparatus for dispensing several products at the same time, into a common receptacle.

2. Description Of the Related Art

In various industries, such as the paint industry, for example, formulations of liquid or pulverulent components are routinely mixed in small batches or quantities. For example, in the retail paint industry, paint and other coatings are custom-mixed in relatively small quantities (e.g., 1 gallon or 5 gallon containers) for individual customers, on a demand basis. Today, paint and similar coatings are custom-mixed in a wide variety of retail establishments, such as paint and department stores, hardware stores, and home decorating centers. Custom blending or "tinting" of a paint or other coating material usually requires adding several components, such as small quantities of different colored tints, to a paint base. Typically, the tinting materials are dispensed directly into a container of paint base material, sequentially, one at a time.

In one popular type of dispenser, canisters of colorant material are arranged on a turntable and are indexed one at a time over a container of paint base material. Thus, a certain amount of time is required to index the color canisters, and if an operator is interrupted, a note must be made of the paint formulation steps which have already been completed, and those which need to be taken to complete the paint formulation.

Several attempts have been made over the years to automate the dispensing process. For example, computers have been provided with paint formulations stored in memory, with the steps required for a paint formulation being sequentially displayed to direct an operator. Such systems have required the operator to manually access a particular colorant canister called for by the computer program and to notify the computer that the dispensing step has been completed for each colorant called for in the formulation.

A number of so-called simultaneous dispense machines have been proposed to further automate the dispensing operation. For example, one machine has been offered for sale by the On Computer Electronics A/S of Copenhagen, Denmark. The machine is described in PCT Published Application No. WO 87/05697. A number of pump pistons are mounted atop a circular plate which is driven from below by a servomotor which drives the circular plate toward and away from an upper plate. Rotary valves are located atop the pistons to dispense a metered amount of fluid pumped by the piston. Multiple pistons disposed in a circle on the circular plate are simultaneously operated by the single servomotor with the rotary valves being operated for a particular pumping stroke to simultaneously dispense metered amounts of fluids. The pistons are individually mounted as discrete components on the circular plate, with the rotary valves carried directly on the pistons.

In another example of a simultaneous dispense machine, U.S. Pat. No. 4,946,100 to Peter Fleming and Robert Dee shows a system with multiple stages of dispensing actuation. A motor-driven screw shaft reciprocates a ball screw back and forth along the shaft axis. An actuating arm carried on the ball screw drives a piston rod so as to pressurize a hydraulic circuit. The hydraulic circuit drives a plurality of piston pumps arranged about a part-circular base plate. A series of valves directs pressurized flow to a dispense head. However, advances are still sought for automating the dispensing operation.

SUMMARY OF THE INVENTION

It is an object of the present invention to provide paint dispensing apparatus for liquid and pulverulent materials.

Another object according to principles of the present invention is to provide a dispense apparatus in which a plurality of liquid components are simultaneously dispensed into a common receptacle.

Yet another object according to principles of the present invention is to provide simultaneous dispense apparatus having a plurality of pump arrangements, driven by a common actuator.

A further object according to principles of the present invention is to provide simultaneous dispense apparatus of the above-described type in which the pumps are actuated in a common pumping cycle with the discharges of individual pumps being selectively valved according to individual valving cycles.

These and other objects according to principles of the present invention are provided in dispensing apparatus, comprising:

a frame;

a bottom plate supported by the frame;

a top plate;

at least one slide support means carried by said bottom plate so as to extend toward said top plate;

at least one of said slide support supporting said top plate above said bottom plate;

a generally rectangular drive plate slidably supported by said at least one slide support for movement toward and away from said bottom plate;

a plurality of material supply vessels;

a dispense head;

a plurality of selectively operable valve means coupled to said dispense head;

a plurality of pump means for pumping said material carried by said bottom plate and arranged on said bottom plate in a rectangular pattern, having inlets coupled to respective ones of said material supply vessels and outlets coupled through respective ones of said valve means to said dispense head, said pump means further having first ends coupled to said drive plate and second ends coupled to said bottom plate, said first and second ends movable with respect to each other so as to pump material through said pump means; and actuating means for moving said drive plate toward and away from said bottom plate so as to pump material through said pump means.

BRIEF DESCRIPTION OF THE DRAWINGS

FIG. 2 is a side elevational view thereof;

FIG. 3 is a front elevational view thereof;

FIG. 6 shows the apparatus of FIG. 1 in exploded, perspective form;

FIG. 7 is an end view of a pump manifold shown in FIG. 6;

FIG. 8 is a top plan view thereof;

FIG. 9 is a cross-sectional view taken along the line 9—9 of FIG. 8;

DETAILED DESCRIPTION OF THE PREFERRED EMBODIMENT

Figure 1:
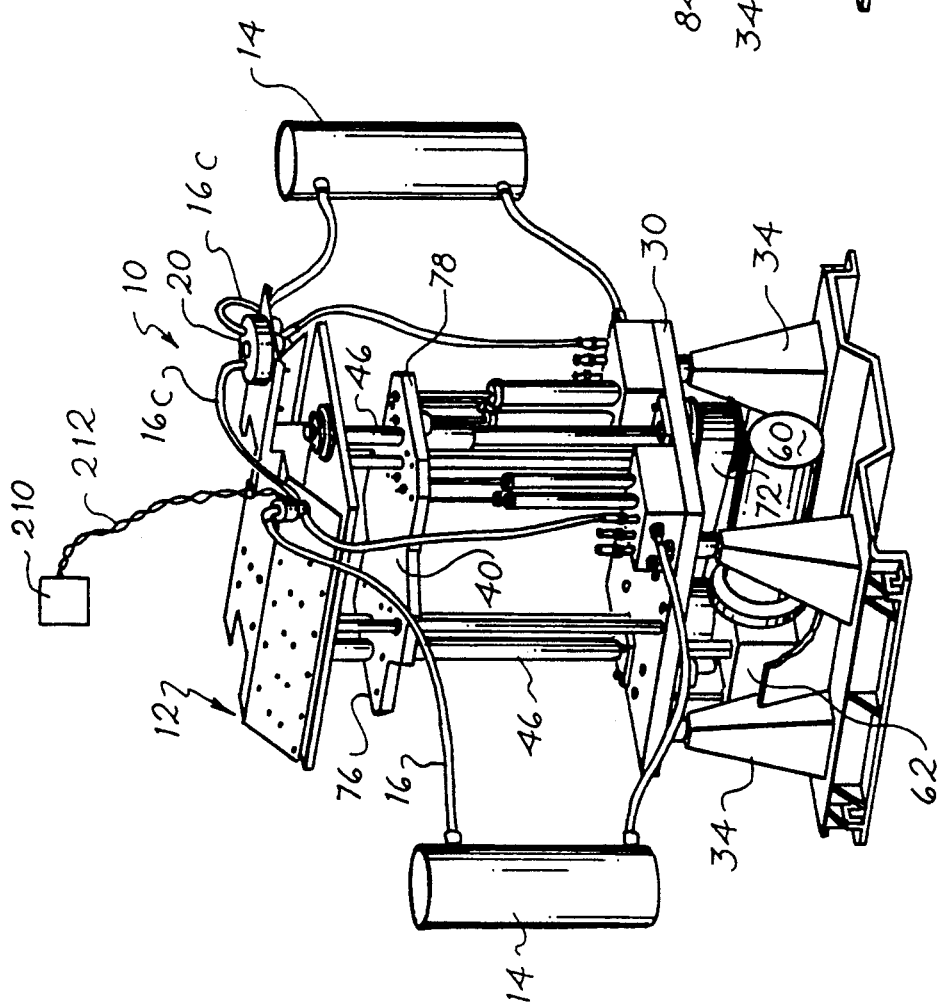
FIG. 1 is a perspective view of apparatus illustrating principles of the present invention.

Referring now to the drawings, and initially to FIGS. 1-5, paint dispensing apparatus is generally indicated at 10. In FIG. 1, the paint dispensing apparatus is shown, with a pump mechanism generally indicated at 12, coupled to canisters 14 by conduit 16. In FIG. 1, only two pump and canister assemblies are shown, for purposes of clarity. In FIGS. 2-5, the canisters and conduits are omitted. The dispensing apparatus 10 has found immediate acceptance in the paint industry, for simultaneously dispensing different colorants or tints into a common receptacle holding a paint base material. It is contemplated that each canister 14 will hold a different colorant or paint additive which will be conducted through an individual pumping circuit to a common dispense head 20, shown in FIGS. 1 and 3, for example. A receptacle holding paint base material (e.g., a 1 gallon or 5 gallon can) is positioned underneath dispense head 20. Apparatus 10 is then operated to deliver the ingredients for a desired paint formulation, in the receptacle.

Figure 5:
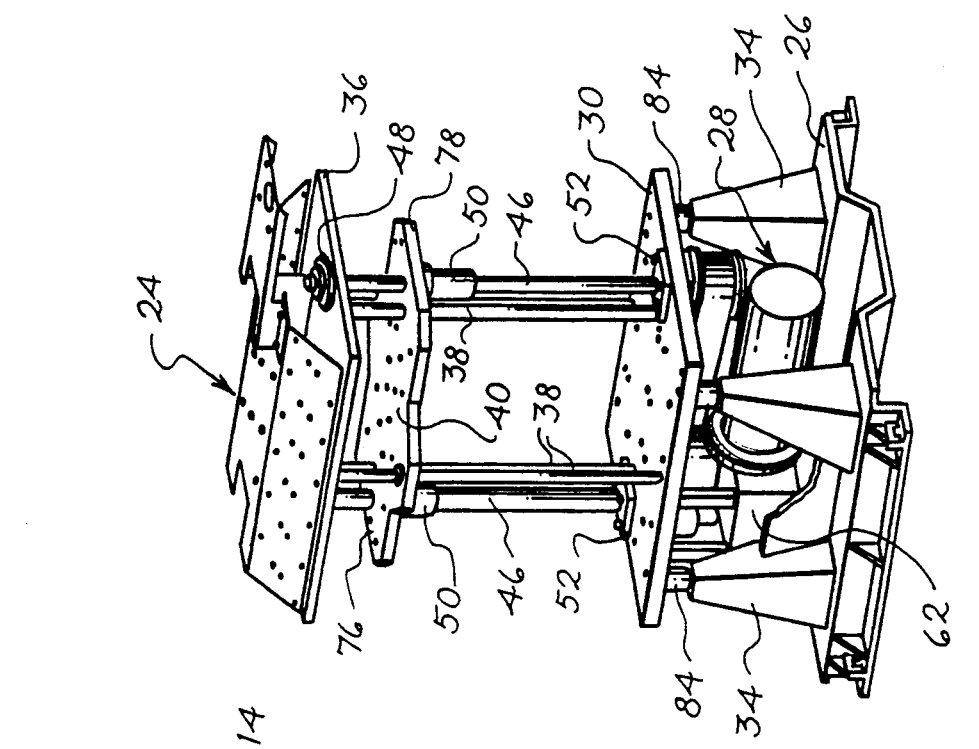
FIG. 5 is a perspective view of the apparatus of FIG. 1 with pumping units and storage canisters attached.

FIG. 5 shows a pump actuator system generally indicated at 24. The pump mechanisms and their conduit connections have been omitted from FIG. 5. As will be seen herein, the pump mechanisms include plungers telescopically mounted in a tube, which are operated by reciprocating the plungers back and forth along the centerline of their longitudinal axes. The pump actuator system 24 provides the reciprocal movement for the pump plungers.

Referring again to FIG. 5, pump actuator system 24 includes a mounting base 26 and a drive system, generally indicated at 28, mounted beneath a base plate 30. The base plate 30 is preferably rectangular and is secured to mounting base 26 by shock-absorbing pylons 34. A top plate 36 is suspended above base plate 30 by a plurality of rigid guide rods 38, which are fixed at their bottom ends to base plate 30 and at their top ends to top plate 36. A traveling plate 40, also preferably rectangular, is mounted for sliding reciprocation along guide rods 38, between the top and base plates 36, 30. As shown in the drawings, traveling plate 40 has a generally T-shaped configuration. As will be seen herein, the pumps are mounted between traveling plate 40 and base plate 30, with the plungers attached to the traveling plate.

Figure 4:
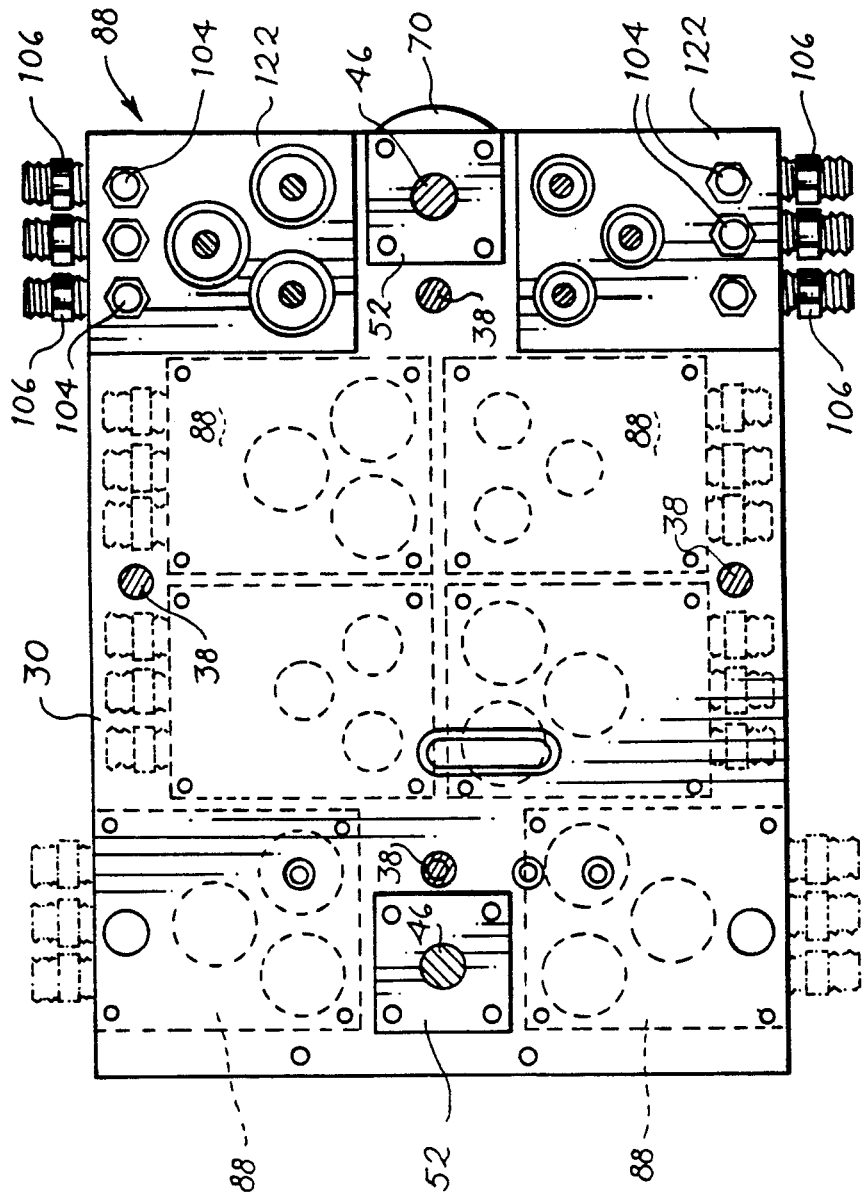
FIG. 4 is a cross-sectional view taken along the line 4—4 of FIG. 3.

Referring to FIG. 4, the base plate 30 is shown on an enlarged scale. As can be seen in FIG. 4, in the preferred embodiment, four guide rods 38 are provided, and are located along the mutually perpendicular centerlines of the rectangular base plate 30. In the preferred embodiment, the four guide rods 38 are maintained parallel to one another and are oriented generally perpendicular to the top and base plates 36, 30, to which they are fixedly secured. The guide rods 38 are inserted through apertures in traveling plate 40, and the apertures are preferably sized for a minimum clearance with the guide rods so as to cooperate with a pair of drive screws (to be explained herein) to maintain the traveling plate 40 generally parallel to the top and base plates 36, 30.

If desired, the top plate could be supported by a frame arrangement supported by base plate 30 or by floor-contacting members, for example. Guide rods 38 also maintain parallelism of plates 36, 30, and interact between these stationary plates and the traveling plate 40 to maintain alignment of critical components of the pump actuator system. As will be seen herein, it has been found important to maintain parallelism of the traveling plate 40 for a number of reasons, including, for example, maintaining synchronism and controlled pressure over the plurality of pumps which are simultaneously actuated by system 24.

Referring especially to FIGS. 2 and 3, the pump actuator system 24 further comprises a pair of lead screws or threaded drive screws 46, which have generally vertical central axes and which have an upper end rotatably mounted to top plate 36 by bearings 48 and which have bottom ends extending below base plate 30 (as can be seen in the bottom, right hand corner of FIG. 6, for example). The lead screws 46 pass through suitably sized apertures in base plate 30 so as to be freely rotatable in the base plate without imparting an axial force thereto (i.e., a vertical force extending parallel to the center longitudinal axis of the lead screws). The leads screws 46 also pass through suitably sized apertures in traveling plate 40. In the preferred embodiment, bushings 54 are provided in traveling plate 40 to reduce friction, and to enhance the alignment of the plate with the central axes of the rods 38. If desired, the bushings 54 can be eliminated. Thread-engaging fittings 50 are mounted to traveling plate 40 and threadingly engage the drive screws 46. As mentioned, traveling plate 40 freely reciprocates along guide rods 38, which continuously align and guide the traveling plate as it moves between top and base plates 36, 30. The threaded engagement between fittings 50 and drive screws 46 imparts an actuating force to the traveling plate, in directions generally parallel to the central axes of the drive screws. With reference to FIGS. 3 and 4, rotatable mounting of drive screws 46 within base plate 30 is provided by rotation fittings 52.

In the preferred embodiment, the diameter, pitch and rotational speed of the drive screws 46 are substantially identical from one drive screw to another, and, thus, the actuating force (directed along the central axes of the drive screws) is preferably balanced between the two drive screws. With additional reference to FIG. 6, drive system 28 includes a drive motor 60 having an output shaft coupled to a gear train contained in housing 62. The gear train has a vertical output shaft 64 secured to the bottom end 66 of one drive screw 46. In the preferred embodiment, a shaft encoding system is contained either in housing 62 or in the housing of motor 60, or mounted at the rear of the motor, for control over related pumping/dispensing cycles, as will be explained herein.

A belt driven sprocket 70 is secured to output shaft 64 to provide a convenient power takeoff for driving the remaining drive screw 46, which also has a belt driven sprocket 70 secured to its lower end 66. A timing belt 72 extends between sprockets 70 to provide a synchronized rotational drive for the remaining drive screw 46 located remote from motor 60. Timing belt 72 is preferably of the cog-belt or toothed-belt type to provide positive, reliable timing between the drive screws. As shown in FIGS. 2 and 6, for example, an idler pulley 80 is employed to maintain the proper tension on timing belt 72, so as to ensure proper engagement with belt drive sprockets 70. Thus, when motor 60 is energized, the gear train in housing 62 is driven to rotate output shaft 64 in a desired direction. This, in turn, simultaneously drives both drive screws 46 in the same direction, at the same speed, and "in-phase" with one another. Thus, with reference to FIG. 2, the opposed ends 76, 78 of traveling plate 40 are displaced identical amounts in vertical directions with a precision sufficient to maintain substantial parallelism with top and base plates 36, 30.

Figure 10:
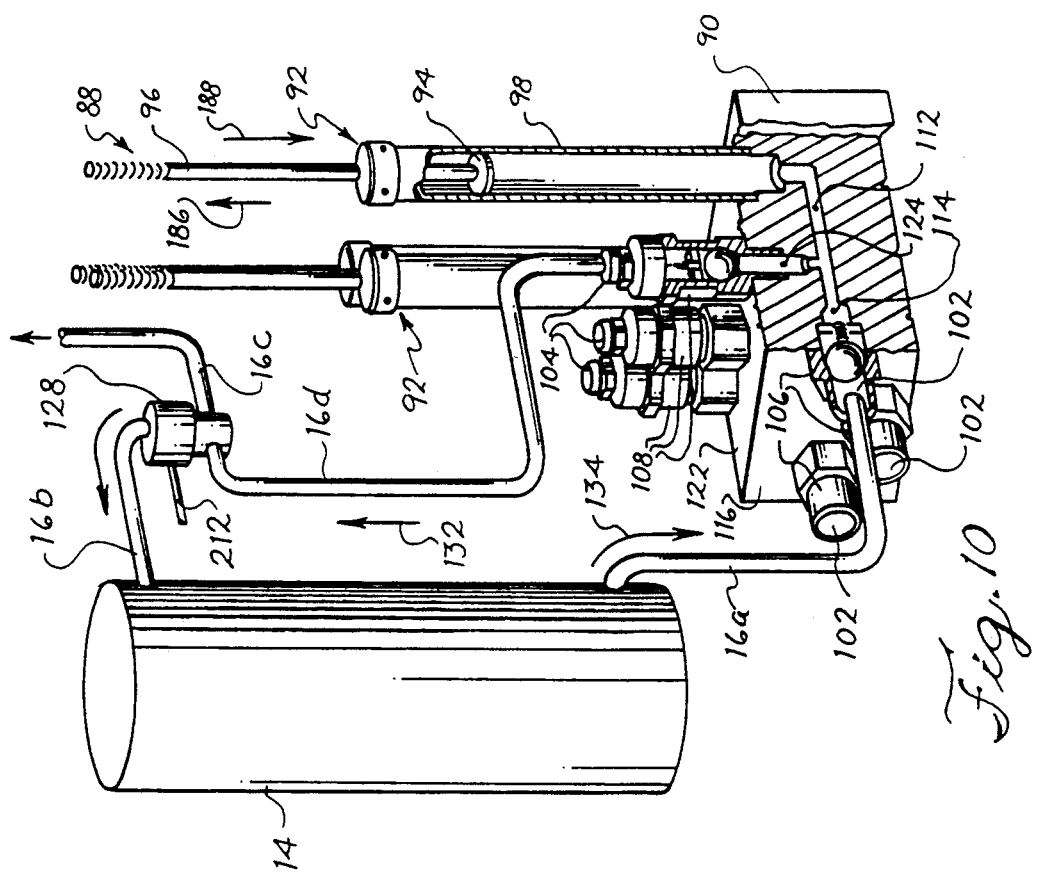
FIG. 10 is a fragmentary perspective view of the pump manifold with storage canister and valving attached, shown partly broken away.
Figure 11:
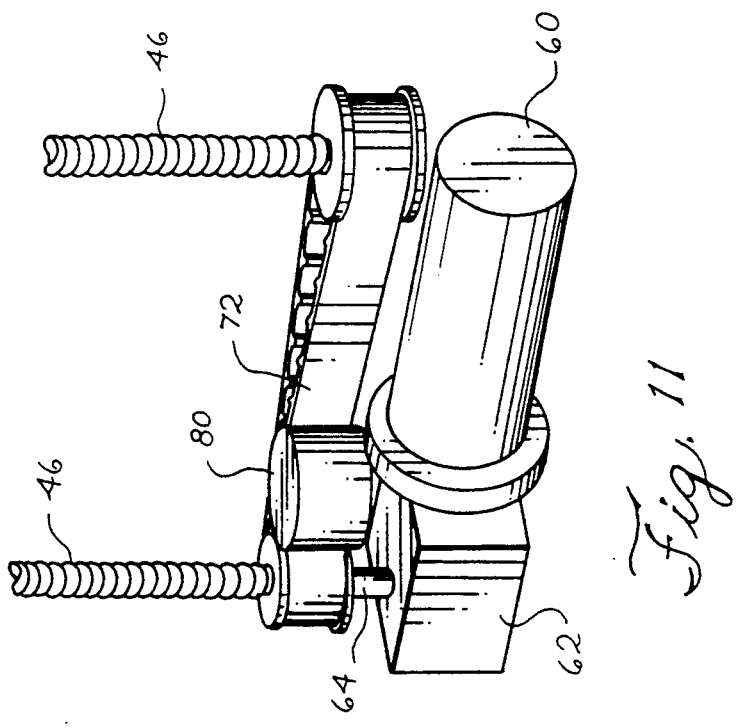
FIG. 11 is a fragmentary perspective view of the motor and drive train of FIG. 6.

As can be seen in FIG. 10, the upper ends of plunger shafts 96 are threaded and, with reference to FIGS. 1-3, the threaded ends are inserted through apertures in traveling plate 40. The plunger shafts are secured to traveling plate 40 with threaded nut fasteners 97 (see FIG. 3) so as to be rigidly connected thereto. Thus, displacements of traveling plate 40 are tightly coupled to the plunger shafts of the various fluid circuits. The pumping cycles for the various pump members may thereby be synchronized for simultaneous operation.

As mentioned, pylons 34 have shock-absorbing capability, and this is preferably provided by shock-absorbing units 84, visible, for example, in FIGS. 2 and 3, which sit atop the pylon base housing. As will be appreciated by those skilled in the art, forces of considerable magnitude are generated in a typical drive system, and the shock-absorbing units 84 help to prevent the mounting base 26 from creeping. Thus, the paint dispensing apparatus can be provided to a user as a portable or semi-portable machine, which need not be mounted to the building floor. The shock-absorbing feature also aids in maintaining uniform pressures throughout the array of pumps driven by the actuator system 24. For example, if the apparatus is prone to creeping or "walking", it is possible that the apparatus might creep onto an inclined or uneven portion of a building floor. As implied by the drawings, the top and base plates, as well as the traveling plate, are fairly thick and of considerable weight so as to maintain the upper ends of the plungers in alignment in a common plane. If apparatus 10 is allowed to assume a substantially inclined position, gravitational forces might create imbalances amongst the various pumps. Also, a sideways or lateral force may be imparted to the pump plungers, which could tend to deform the plunger seals, especially when the machine is left idle, in an inclined position, over prolonged periods of time.

Referring again to FIG. 6, and also to FIG. 10, a pair of pump modules 88 are shown in the exploded perspective view. Each pump module includes a mounting block 90 and a plurality of pump members 92, each including a plunger 94 with a plunger shaft 96 and a tube 98. As will be seen, the pump modules are self-contained, and include threaded fittings to provide the features needed to manage fluid flow. In the preferred embodiment, the paint dispensing apparatus employs a plurality of pump modules, with each pump module containing an equal number (preferably three) of pump members. In the preferred embodiment, eight pump modules are employed, four pump modules having the same larger-sized pump members, and four pump modules having the same smaller-sized pump members, as can be seen, for example, in FIG. 4. Except for the size of the pump members, the pump modules are identical throughout the paint dispensing apparatus. Different modules could have different numbers of pump members, if desired.

According to one aspect of the present invention, the pump members are grouped on discrete mounting blocks for independent mounting within the paint dispensing apparatus. As can be seen in FIG. 4, the pump mounting blocks are preferably of a single constant size, and a particular pump module, whether of larger or smaller size, can be relocated to any of the eight positions available in the preferred embodiment. This flexibility in pump mounting allows the pumping forces to be uniformly distributed across the traveling plate and base plate. The conduits 16 coupling the various pump members to other elements in a dispensing circuit are preferably of flexible tubing construction and, except for problems encountered with congestion of multiple conduits and related conduit routing problems, the various pump modules can be freely relocated anywhere on base plate 30, as required for a particular machine configuration.

Referring now to FIGS. 7-10, for each fluid circuit the pump modules 88 include inlet ports 102 and outlet ports 104, in addition to a pump member 92. The inlet and outlets ports 102, 104 preferably comprise portions of ball-type check valves 106, 108 associated with the inlet and outlet, respectively. The check valves are threadingly engaged with a common mounting block 90. Referring especially to FIGS. 7-9, the mounting block 90 is preferably made from a unitary metal block, although laminated constructions and other constructions can be employed.

In the preferred embodiment, three fluid circuits are accommodated by each mounting block, although different numbers of fluid circuits could also be accommodated, if desired. Preferably, the fluid circuits are maintained separate from one another, apart from the common physical mounting. The mounting block 90 has, for each fluid circuit, a passageway 112 which extends in a generally horizontal direction having a threaded inlet portion 114 at a front face 116 of the mounting block. Passageway 112 is terminated at its other end by an enlarged threaded opening 120 formed in the upper face 122 of the mounting block. An upwardly opening passageway 124 having a threaded opening 126 formed in the upper face 122 communicates with passageway 112, at a point between inlet and outlet openings 114, 120.

In essence, the mounting block defines a "Y" connection for the fluid circuit. The pump members 92 received in threaded openings 120 generate fluid flows in both directions into and out of the openings. The check valves 106 limit fluid flows into threaded opening 114 and prevent fluid flows in an opposite direction, out of the mounting block. The check valves 108 limit fluid flows to a direction out of the mounting block and prevent flows in a reverse direction which would otherwise enter the mounting block through threaded openings 126. As can be seen in FIG. 7, the opening 114 of the central fluid circuit is located below the other openings 114. This lengthens the vertical passageway 124 to compensate for the reduced offset distance from front face 116 of the mounting block, thus making the fluid circuits in the mounting block of generally equal length.

As will be appreciated by those skilled in the art, the mounting block 90 can be fabricated using fairly simple machine tooling. However, other designs are possible. For example, mounting block 90 could be fabricated from a number of laminated layers joined together, for example, along centerlines of passageways 112. Optionally, mounting block 90 could be fabricated by laminating top and bottom parts joined together along a common plane passing through the passageways 112.

Referring to FIG. 10, storage canister 14 has an upper end with an inlet connection and a lower end with an outlet connection. The outlet of canister 14 is coupled to check valve 106 by a first conduit 16a. A three-way valve 128 is coupled to the canister input by a second conduit 16b. Conduit 16b is connected to one output of the three-way valve 128 with the second outlet being coupled by a conduit 16c to a dispense head 20 (see FIG. 1). The remaining input port of three-way valve 128 is coupled by conduit 16d to check valve 108. Through the operation of check valve 108, flow in conduit 16d is limited to the direction of arrow 132, and check valve 106 limits flow in conduit 16a to the direction shown by arrow 134.

When plunger shaft 96 is moved upwardly in the direction of arrow 186, flow is induced in conduit 16a with material being drawn from canister 14 to fill pump tube 98. When plunger shaft 96 is moved in an opposite direction, as indicated by arrow 188, flow is induced in passageway 124 so as to exit check valve 108 and to flow through conduit 16d. A portion of the flow in conduit 16d is directed to conduit 16c to the dispense head 20, and the remainder of the flow is returned through conduit 16b to canister 14. Thus, for a significant part of the pumping cycle, flow is "short circuited" being circulated through the respective canisters 14.

With reference to FIGS. 2, 3 and 6, the metering valves 128 are mounted to a plate 150 having a generally trapezoidal end configuration with angled mounting surfaces 152 to which the metering valves 128 are secured with threaded fasteners 154. As can be seen in FIG. 3, for example, the inlet and output ports are thereby oriented toward the fluid circuit components to which they are connected by conduits 16b, 16c and 16d. A support plate 156 is mounted between plate 150 and the top plate 36 to provide extra support for the mounting plate 150 and to provide an enclosure, suitable for controller 210, if desired, which is free from contamination or material spills. Dispense head 20 is secured to mounting plate 150 with a cantilever mounting provided by plate 160. As can be seen in FIG. 1, the dispense head 20 is preferably offset from the remainder of the dispensing apparatus, so as to provide clearance for receiving a paint can or other receptacle underneath. In the preferred embodiment, the conduits connecting the dispense head to the metering valves are preferably made of flexible plastic tubing, thus facilitating a repositioning of the metering valves as may be desired, so as to conform to any repositioning of the pump modules. In the preferred embodiment, an outer cabinet is provided to enclose the paint dispensing apparatus. The outer cabinet has been removed from the drawings for purposes of clarity. Accordingly, with a common pump cycle, a plurality of different materials is simultaneously dispensed from head 20 in the direction of arrow 165 into a common receptacle, such as a can containing a paint base material.

Figures 12, 13:
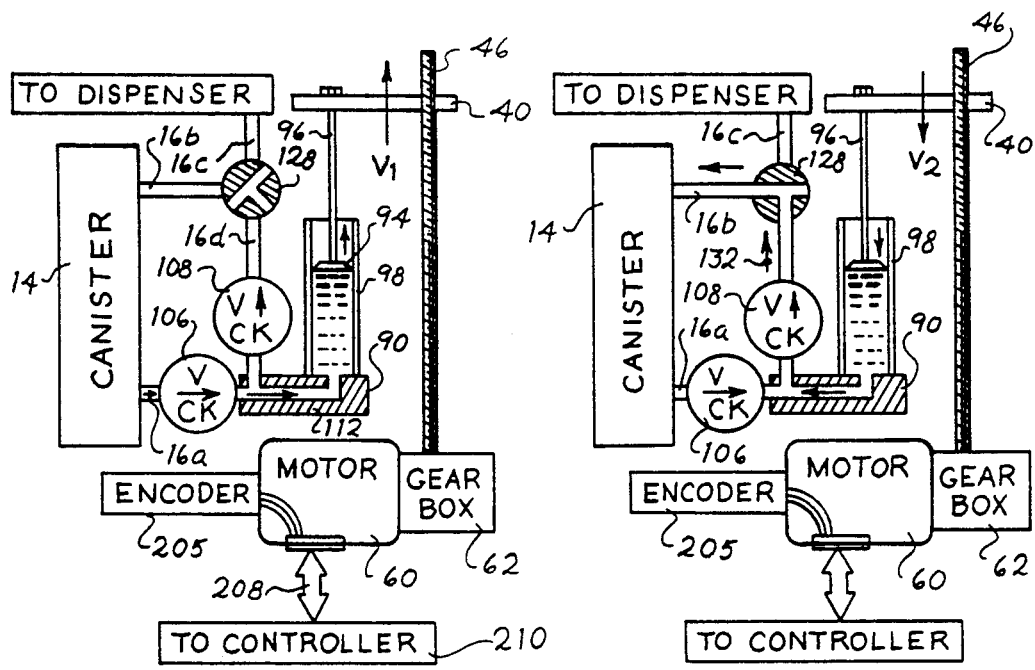
FIGS. 12-15 are schematic diagrams illustrating the sequence of a typical metering operation.

Turning now to FIGS. 12-15, a schematic diagram of a flow circuit for the dispensing apparatus is shown. Canister 14 holds a supply of material to be dispensed. In the preferred embodiment, 24 canisters, each with their own respective fluid circuits, are used. One representative circuit is illustrated in FIGS. 12-15, and a physical embodiment thereof is illustrated in FIG. 10. Referring again to FIG. 12, canister 14 holds a supply of material to be dispensed. In the preferred embodiment, canister 14 hold a colorant to be dispensed into a container with a paint base, to produce a tinted base product. Conduits 16a, 16d and 16b form a closed loop through which the material flows during part of a machine operating cycle. With reference to FIG. 12, material flows in a counterclockwise direction. Provision is made for supplying a source of energy for the material flow and for diverting a portion of the material flow in a controlled manner so as to provide a highly accurate metering of any particular desired quantity of the material in canister 14. As will be seen herein, material flow is provided by a piston pump, a series of check valves, and a three-way valve. According to one aspect of the present invention, the pumping cycle, for larger dispense quantities, is preferably carried out at two different pumping speeds. According to another aspect of the present invention, machine operation is described with reference to pumping and dispensing cycles and, according to one aspect of the present invention, a dispensing cycle (with a metering event) is made to occur within a pumping cycle.

With reference to FIGS. 12-15, pumping and dispensing cycles will be described. As will be appreciated by those skilled in the art, while motor driven operation of one pump may be a routine matter, a number of questions arise when a large number of pumps are simultaneously operated by a common actuator, as will be discussed herein for the preferred embodiment. For the time being, operation of a single fluid circuit will be described. In FIG. 12, plunger 94 is being raised at a velocity $V_1$ by appropriate rotation of drive screws 46. Motor 60 is energized so as to drive gear box 62, and rotation of the motor is monitored by a shaft encoder 205, the output of which is conveniently coupled through a bus connection 208 to a controller 210. As will be seen herein, controller 210, which may be of the analog or digital type, controls operation of the dispensing cycle and is coupled to three-way valve 128 through conductor 212 (see FIG. 1, for example). As shown in FIG. 12, controller 210 monitors the rise of plunger 94, a suction or intake stroke for pump 98. The check valve 106 permits flow of material from canister 14 through passageway 112 of mounting block 90 and into pump 98. Check valve 108 operates to block flow during the suction stroke of the pump.

Referring now to FIG. 13, the beginning of discharge of pump 98 is shown. As will be seen herein, the pump discharge continues through a series of operations shown in FIGS. 14 and 15. FIG. 13 shows operation of pump 98 immediately after the pump reverses direction. As indicated in FIG. 13, traveling plate 40, and hence pump shaft 96, is driven in a downward direction with a velocity $V_2$. In this initial portion of the pump discharge cycle, flow is routed back to canister 14. Check valve 106 blocks flow from entering the bottom of canister 14 through conduit 16a, but flow in an upward direction of arrow 132 is permitted by check valve 108. The three-way valve 128 is open to route material flow through conduit 16b to the top of canister 14. Throughout the pumping stages shown in FIGS. 12 and 13, no material flow is permitted through conduit 16c to the dispenser head 20.

Figures 14, 15:
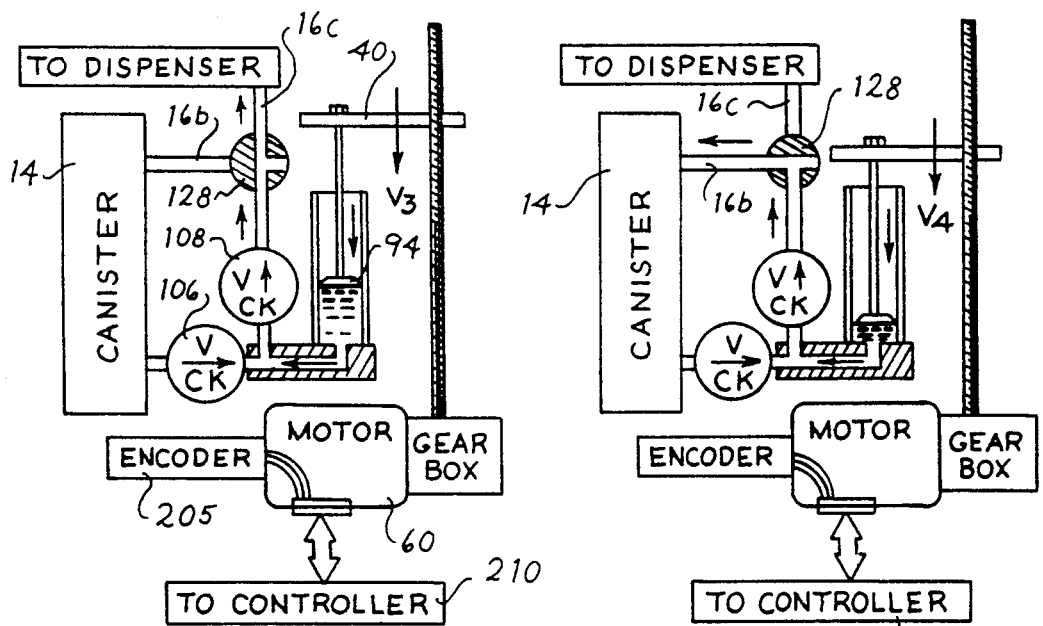

Turning now to FIG. 14, the dispensing cycle or metering event, that period of time during which flow is diverted through conduit 16c to the dispense head, is shown. The three-way valve 128 is opened to permit flow to the dispense head in conduit 16c after flow in conduit 16b has "settled down" to a steady state flow. Discharge of pump 98, as shown in FIG. 14, is carried out at a pump speed $V_3$, as set by the speed of traveling plate 40. As will be seen herein, the speed $V_3$ may either be held constant or may be varied over time, but, in any event, represents the speed of the pump actuator system during the time that three-way valve 128 is "open" so as to direct material to dispense head 20. As mentioned, the output of shaft encoder 205 is monitored by controller 210, which also controls the position of valve 128, and, hence, controller 210 monitors and has accurate control over the quantity of material dispensed and the rate of delivery.

Referring now to FIG. 15, the dispense cycle has been completed, and three-way valve 128 is operated by controller 210 to divert flow away from conduit 16 to return the remaining portion of the material flow through conduit 16b to canister 14, thus completing the discharge portion of the pumping cycle and preparing the dispensing apparatus for the beginning of a new pumping cycle and a new dispensing cycle nested within the pumping cycle. As can be seen, metering of the fluid occurs when the material is in motion, with a portion of the material flow being diverted for metered dispensing.

Figure 17:
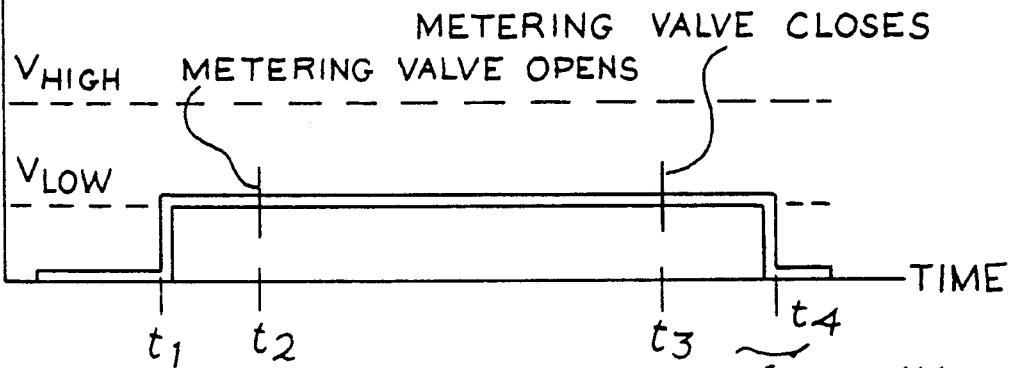
FIG. 17 is a timing diagram for dispensing relatively small quantities of material.

Turning now to FIG. 17, a timing diagram for the dispense cycle is shown. After pump 98 is filled, at the end of its suction stroke, the direction of plunger movement changes, as illustrated in FIG. 13. At this time, $t_1$ in FIG. 17, a discharge flow from the pump is initiated, as indicated in the schematic diagram. The pump speed quickly attains a steady state velocity $V_2$ which, in terms of the schematic diagram of FIG. 17, is equal to the velocity $V_{low}$, a constant steady-state velocity maintained throughout the dispensing cycle. At time $t_2$, the metering valve 128 opens to permit flow to the dispense head and a metering event is initiated throughout a preselected travel of a pump plunger 94 as determined by encoder 205. Controller 210 determines the amount of material dispensed, and when a preselected goal is reached, metering valve 128 is operated in the manner shown in FIG. 15 to close flow to the dispense head. As shown in FIG. 17, discharge operation of the pump preferably continues after the metering event, between times $t_3$ and $t_4$.

During the metering event (represented in FIG. 14, and between times $t_2$ and $t_3$ in FIG. 17), the speed of travel and displacement of the pump plunger is controlled by controller 210. It will be appreciated by those skilled in the art that motor 60 could be readily controlled on a revolution-by-revolution basis, even portions of a revolution, using conventional motor control technology, which will not be discussed here. While a more complicated control of the drive motor 60 during a metering event is desired in some instances, it is generally preferred that a single constant speed be maintained, as indicated in FIG. 17, when the metered quantities are sufficiently small, that is for quantities $Q \leq Q_0$.

Figure 16:
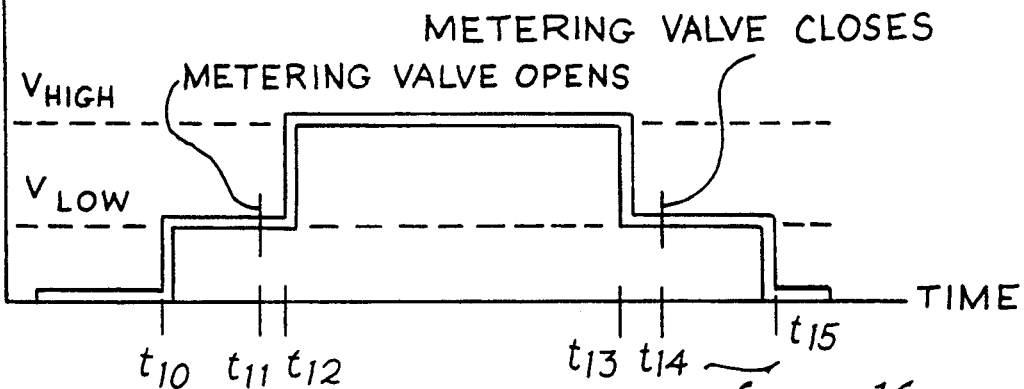
FIG. 16 is a timing diagram for dispensing relatively large quantities of material.

However, for relatively large quantities, i.e., $Q > Q_0$, a dispensing operation schematically indicated in FIG. 16 is generally preferred. With reference to FIG. 16, for times prior to $t_{10}$, the pump is either static, or is undergoing a suction stroke, as indicated in FIG. 12. At time $t_{10}$, the pump plunger begins its discharge stroke, as indicated in FIG. 13, with the velocity $V_2$ corresponding to the velocity $V_{low}$, indicated in FIG. 16. The velocity $V_{low}$ is maintained constant for a period of time during which the valve 128 opens to the dispense head (in the manner indicated in FIG. 14) at time $t_{11}$. In this embodiment, it is generally preferred that the metering event or dispensing continue until time $t_{12}$ with speed held constant at $V_3 = V_{low}$.

The metering event continues between times $t_{11}$ and $t_{14}$. During the metering event pump speed is changed, preferably to a second constant velocity, $V_3 = V_{high}$. At time $V_{12}$, pump velocity is increased to $V_{high}$ and continues at a constant level throughout a portion of the metering event, being reduced to velocity $V_3 = V_{low}$ at time $t_{13}$. The metering event then continues with the pump operated at the relatively low speed $V_3 = V_{low}$, between times $t_{13}$ and $t_{14}$. As indicated in FIG. 16, it is generally preferred that a substantial portion, and most preferably a major portion of the metering event occur at the higher speed $V_{high}$. According to one aspect of the present invention, it is also preferred that the high speed portion of the metering event, i.e., between times $t_{12}$ and $t_{13}$, be bracketed on either side by a low speed metering event, i.e., between times $t_{11}-t_{12}$ and $t_{13}-t_{14}$. At time $t_{14}$, the metering valve 128 is operated to close further flow to the dispense head, in the manner indicated in FIG. 15. It is generally preferred that pump operation continue beyond the time that the metering valve closes flow to the dispense head, as indicated by the time interval $t_{14}-t_{15}$ in FIG. 16. As can be seen in the schematic diagram of FIG. 16, operation of motor 60 (and hence the transmission path through the gear box, drive screws and traveling plate, and eventually operation of the pump) may be handled as a stepwise event.

Other operations of the pump actuator system are, of course, possible. For example, in FIG. 18, an optional, less preferred multiple speed metering event is shown. At time $t_{20}$, the pump begins its discharge stroke, as indicated in FIG. 13, with the pump accelerating from rest to a velocity $V_2 = V_{low}$. At this point in time, $t_{21}$, the metering valve 128 is operated by controller 210 so as to open flow to the dispense head. The metering event in this alternative embodiment continues between times $t_{21}$ and $t_{24}$. During the metering event, the pump velocity $V_3$ indicated in FIG. 14 is increased from $V_{low}$ at time $t_{21}$ to speed $V_{high}$ at time $t_{22}$, and is maintained constant at $V_{high}$ until time $t_{23}$. Between times $t_{23}$ and $t_{25}$, the pump is decelerated, and at time $t_{24}$ during the deceleration, metering valve 128 is operated by controller 210 so as to close off flow to the dispense head. Preferably, pump discharge continues beyond time $t_{24}$.

Figure 18:
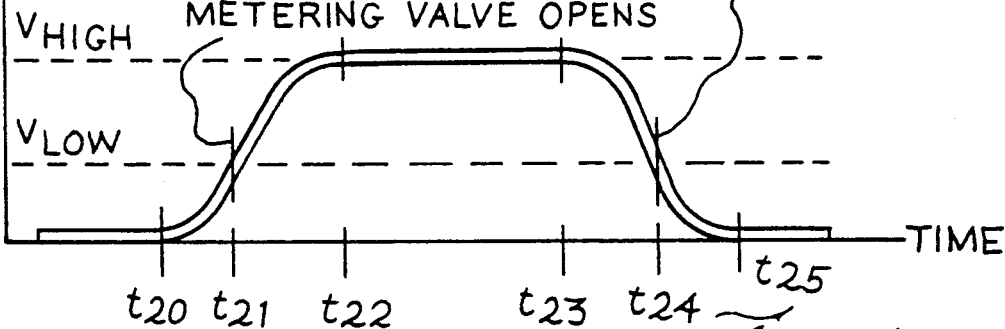
FIG. 18 is a timing diagram for dispensing conditions similar to those of FIG. 16, but showing an alternative timing curve.

As shown in FIG. 18, the pump velocity has a rate of rise between times $t_{20}$ and $t_{22}$ and a rate of fall between times $t_{23}$ and $t_{25}$. It is most preferred that the metering event begin at a lower pump velocity and that pump velocity be increased while the metering valve is open to direct flow to the dispense head. However, if desired, the metering event can be limited to the high speed portions of the pump discharge cycle, for example, between times $t_{22}$ and $t_{23}$ in FIG. 18.

As can be seen from the above, it is generally preferred that the valve opening and valve closing operations are made at generally the same pump speed. For example, in FIG. 16, the valve opening and closing occur at pump speed $V_{low}$. If desired, the valve opening can occur at a different pump speed than the valve closing, either higher or lower than the pump speed at the time of valve closing. Further, although it is preferred that the dispense cycle have a single peak, as shown in FIGS. 16-18, the pump speed-time response curve can have multiple peaks, if desired.

As will be appreciated from the above timing diagrams, and as will be recognized by those skilled in the art, metering events can occur over remarkably short time periods. Consider the pump arrangement shown in FIG. 4 wherein 24 pumps are simultaneously actuated. According to one aspect of the present invention, it is preferred that each of the pumps in the dispensing apparatus have the same performance curves, e.g., the velocity-time diagram shown in FIGS. 16-18, and that the response curves for various pumps be substantially identical and not merely similar. For example, it is generally preferred that there be no substantial time lag between the operations of the various pumps of the paint dispensing apparatus, including relatively minor "phase shift" variations wherein a timing diagram for one pump is identical to the timing diagram for another pump, except being shifted small amounts in time. Accordingly, with the dispensing apparatus described above, steps have been taken to minimize, and even eliminate, errors in the simultaneous operation of the several pumps in the dispensing apparatus.

It is, of course, possible to adjust for such timing discrepancies, once defined, by programming different response times for the individual pumps in controller 210. For example, conventional techniques can be used if controller 210 takes the form of a digital computer and the time of operation of a particular valve can be shifted to compensate for a shift in the pump speed-time characteristic of the pump with which the valve is associated. It is desirable for this reason and for other reasons that an individual valve 128 be associated with each respective pump. However, it is most preferred that timing inaccuracies are not allowed to develop amongst the various pumps of the dispense apparatus.

According to one aspect of the present invention, the pumps are arranged in pump modules with multiple pump members being mounted to a common pump mounting block, as described above. It is most preferred that the same number of pumps be used with each mounting block, although different numbers of pump members could be used with different pump modules, if desired. It has been found difficult to control the localized deflection along circular drive plates, and it is preferred that the pump modules be arranged on the base plate 30 in a noncircular pattern, most preferably a rectangular pattern such as that shown in FIG. 4. The rectangular plate has been found easier to control over portions of its surface, as is necessary when a plurality of different pump members are distributed throughout a common drive plate area.

According to another aspect of the present invention, it is generally preferred that the pump modules be aligned generally in a linear or serial array. In a preferred embodiment, illustrated in FIG. 4, two such serial arrays are illustrated, one alongside the other. Because of the positioning of the drive screws and their associated hardware, it has been found convenient to displace the outermost modules of each serial array slightly, as can be seen in the figure. Preferably, two drive screws are employed, one adjacent each end of the serial array(s) of pump modules.

In the preferred embodiment, four guide rods 38 are employed for the generally rectangular pump distribution. The guide rods are arranged in pairs extending along mutually perpendicular lines. For example, a first pair of guide rods are located in line with the drive screws 46 and the second pair of guide rods are positioned along a line perpendicular thereto. As shown in the preferred embodiment, a pair of guide rods are located between the drive screws, although the drive screws could be located inside of a pair of guide rods, if desired. In the preferred embodiment, the guide rods and drive screws are located remote from the outer corners of the rectangular base plate 30. If desired, however, guide rods could be located adjacent each of the four corners of the rectangular base plate.

As can be seen in FIG. 4 and as explained above, the individual pump members come in two different sizes. However, center spacing of the pump members is maintained constant from one pump module to another, regardless of pump member size. Preferably, the other dimensions of a pump module are maintained constant from one module to another, and the pump modules are thus interchangeable with one another. As will be appreciated by those skilled in the art, greater force is required to drive the plunger of a larger diameter pump and, accordingly, when different pump sizes are employed in the same dispensing apparatus, care must be taken to balance the pump resistance forces across the drive plate and base plate. If desired, pumps of different sizes could be located on the same mounting block, although it is preferred that the pump members all be of a similar size for a given pump module. As can be seen in FIG. 4, the location of the pump modules, of the guide rods 28 and of the drive screws 46 all exhibit two-fold symmetry. This symmetry is further maintained in the orientation of pump modules of different sizes. An end user may, over time, wish to modify the pump arrangement, to accommodate smaller or larger pump sizes. With pump dispersing apparatus according to principles of the present invention, this is readily attained since the centerline spacings, bolt holes and other dimensions of the pump modules are maintained constant throughout.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following Claims.

What is claimed is:

1. Dispensing apparatus, comprising:
   a frame;
   a bottom plate supported by the frame;
   a top plate;
   at least one slide support carried by said bottom plate so as to extend toward said top plate;
   at least one of said slide support supporting said top plate above said bottom plate;

a generally rectangular drive plate slidably supported by said at least one slide support for movement toward and away from said bottom plate;
a plurality of material supply vessels;
a dispense head;
a plurality of selectively operable valve means coupled to said dispense head;
a plurality of pump means for pumping said material carried by said bottom plate and arranged on said bottom plate in a rectangular pattern, having inlets coupled to respective ones of said material supply vessels and outlets coupled through respective ones of said valve means to said dispense head, said pump means further having first ends coupled to said drive plate and second ends coupled to said bottom plate, said first and second ends movable with respect to each other so as to pump material through said pump means; and
actuating means for moving said drive plate toward and away from said bottom plate so as to pump material through said pump means.

2. The apparatus of claim 1 wherein said at least one slide support has first ends coupled to said top plate and second ends coupled to said bottom plate, and said at least one slide support passing through said drive plate.

3. The apparatus of claim 1 wherein said pump means first ends are removably coupled to said drive plate.

4. The apparatus of claim 1 wherein said pump means second ends are removably coupled to said bottom plate.

5. The apparatus of claim 1 wherein said pump means are arranged side-by-side in at least one linear array.

6. The apparatus of claim 5 wherein said pump means are arranged side-by-side in at least two linear arrays.

7. The apparatus of claim 5 wherein said at least one slide support means comprises a first pair of slide supports and said at least one linear array is located generally between said at least one slide support means.

8. The apparatus of claim 7 wherein said at least one slide support means further comprises a second pair of slide supports located generally between said first pair of slide support means.

9. The apparatus of claim 8 wherein said first and said second pairs of slide supports are located generally along perpendicular reference lines.

10. Dispensing apparatus, comprising:
a frame;
a bottom plate supported by the frame;
a top plate;
at least one slide support carried by said bottom plate so as to extend toward said top plate;
at least one of said frame and said slide support supporting said top plate above said bottom plate;
a drive plate slidably supported by said at least one slide support means for movement toward and away from said bottom plate;
a plurality of material supply vessels;
a dispense head;
a plurality of selectively operable valve means coupled to said dispense head;
a plurality of pump means for pumping said material carried by said bottom plate, each pump means comprising a plurality of pump members coupled to a common base which is removably mounted to said bottom plate, said pump members having inlets coupled to respective ones of said material supply vessels and outlets coupled through respective ones of said valve means to said dispense head, said pump means further having first ends coupled to said drive plate and second ends coupled to said bottom plate, said first and second ends movable with respect to each other so as to pump material through said pump means; and
actuating means for moving said drive plate toward and away from said bottom plate so as to pump material through said pump means.

11. The apparatus of claim 10 wherein said pump means are arranged side-by-side in at least one linear array.

12. The apparatus of claim 11 wherein said pump means are arranged side-by-side in at least two linear arrays.

13. The apparatus of claim 10 wherein said pump means first ends pass through said drive plate and are removably attached to said drive plate.

14. The apparatus of claim 13 wherein said pump means first ends are threaded and are removably attached to said drive plate by threaded fasteners.

15. The apparatus of claim 10 wherein said pump means bases are of generally equal size to as to be interchangeable one with another.

16. The apparatus of claim 15 wherein said pump members are of at least two different sizes.

17. The apparatus of claim 16 wherein said pump members, regardless of size, have generally equal centerline spacing with respect to their common base.

18. Dispensing apparatus, comprising:
a frame;
a bottom plate supported by the frame;
a top plate;
at least one slide support carried by said bottom plate so as to extend toward said top plate;
at least one of said frame and said slide support supporting said top plate above said bottom plate;
a drive plate slidably supported by said at least one slide support for movement toward and away from said bottom plate;
a plurality of material supply vessels;
a dispense head;
a plurality of selectively operable valve means coupled to said dispense head;
a plurality of pump manifold blocks removably mounted to said bottom plate, having inlets coupled to respective ones of said material supply vessels and outlets coupled through respective ones of said valve means to said dispense head;
a plurality of pump members coupled to the pump manifold blocks, said pump members having first ends coupled to said drive plate and second ends coupled to said bottom plate, said first and second ends movable with respect to each other so as to pump material through said pump means; and
actuating means for moving said drive plate toward and away from said bottom plate so as to pump material through said pump means.

19. The apparatus of claim 18 wherein said pump manifold blocks are removably coupled to said bottom plate.

20. The apparatus of claim 18 wherein said pump means are arranged side-by-side in at least one linear array.

21. The apparatus of claim 20 wherein said pump means are arranged side-by-side in at least two linear arrays.

22. The apparatus of claim 18 wherein at least three pump members are mounted on each pump manifold block.

23. The apparatus of claim 22 wherein the inlets and outlets of a pump manifold block are located on respective faces of the block and wherein the inlets and outlets of a pump manifold block are offset at generally right angles to one another.

24. The apparatus of claim 18 wherein said drive plate is of generally flat, planar configuration.

25. The apparatus of claim 24 wherein said drive plate is of generally rectangular configuration.

26. Dispensing apparatus, comprising:
a frame;
a bottom plate supported by the frame;
a top plate;
at least one slide support carried by said bottom plate so as to extend toward said top plate;
at least one of said frame and said slide support supporting said top plate above said bottom plate;
a drive plate slidably supported by said at least one slide support for movement toward and away from said bottom plate;
a plurality of material supply vessels;
a dispense head;
a plurality of selectively operable valve means coupled to said dispense head;
a plurality of pump means for pumping said material carried by said bottom plate, having inlets coupled to respective ones of said material supply vessels and outlets coupled through respective ones of said valve means to said dispense head, said pump means further having first ends coupled to said drive plate and second ends coupled to said bottom plate, said first and second ends movable with respect to each other so as to pump material through said pump means;
actuating means for moving said drive plate toward and away from said bottom plate so as to pump material through said pump means, said actuating means comprising a plurality of drive screws carried by said bottom plate so as to extend toward said top plate and said actuating Means furthre comprising rotating means for rotating said drive screws; and
said drive plate threadingly engaging said drive screws so as to be moved toward and away from said bottom plate as said drive screws are rotated.

27. The apparatus of claim 26 wherein said rotating means comprises a motor coupled to said plurality of drive screws by motor coupling means.

28. The apparatus of claim 27 wherein said drive screws extend through said bottom plate and said motor and said motor coupling means are mounted beneath said bottom plate so as to engage bottom ends of said drive screws.

29. The apparatus of claim 27 wherein said drive screws are driven in the same direction and at the same speed.

30. The apparatus of claim 27 wherein said actuating means further comprises shaft encoding means for monitoring the rotation of said drive screws, said shaft encoding means coupled to said motor to control motor rotation.

31. The apparatus of claim 26 wherein said at least one slide support comprises a first pair of slide supports and said plurality of pump means is located generally between said at least one slide support.

32. The apparatus of claim 31 wherein said at least one slide support further comprises a second pair of slide supports located generally between said first pair of slide support means.

33. The apparatus of claim 32 wherein said first and said second pairs of slide supports are located generally along perpendicular reference lines.

34. Dispensing apparatus, comprising:
a frame;
a bottom plate supported by the frame;
a top plate;
at least one slide support carried by said bottom plate so as to extend toward said top plate;
at least one of said frame and said slide support supporting said top plate above said bottom plate;
a drive plate slidably supported by said at least one slide support for movement toward and away from said bottom plate;
a plurality of material supply vessels;
a dispense head;
a plurality of selectively operable valve means coupled to said dispense head;
a plurality of pump means for pumping said material having inlets coupled to respective ones of said material supply vessels and outlets coupled through respective ones of said valve means to said dispense head, said pump means further having first ends coupled to said drive plate and second ends coupled to said bottom plate, said first and second ends movable with respect to each other so as to pump material through said pump means; and
actuating means for moving said drive plate toward and away from said bottom plate with a speed selectable between at least two different speeds, so as to operate said pump means with a preselected speed during a pumping cycle in which material is dispensed.

35. The apparatus of claim 34 wherein said actuating means moves said drive plate at an initial lower speed at a first portion of a pumping cycle.

36. The apparatus of claim 34 wherein said actuating means moves said drive plate at a faster speed during a second, subsequent portion of a pumping cycle.

37. The apparatus of claim 34 wherein said actuating means thereafter moves said drive plate through a third portion of a pumping cycle at a faster speed.

38. The apparatus of claim 34 wherein said actuating means moves said drive plate at a generally constant speed during a throughout a pumping cycle.

* * * * *

UNITED STATES PATENT AND TRADEMARK OFFICE
CERTIFICATE OF CORRECTION

PATENT NO. : 5,305,917
DATED : April 26, 1994
INVENTOR(S) : Miller et al.

It is certified that error appears in the above-indentified patent and that said Letters Patent is hereby corrected as shown below:

Column 14, line 23, change "to as to" to --so as to--.
Column 16, line 58, change "during a" to --during and--.

Signed and Sealed this

Eighth Day of August, 1995

Attest:

BRUCE LEHMAN

*Attesting Officer*      *Commissioner of Patents and Trademarks*